June 16, 1964 D. W. CHAMBERLIN 3,137,383
FRUIT PREPARATION MACHINE
Filed Oct. 10, 1961 12 Sheets-Sheet 1
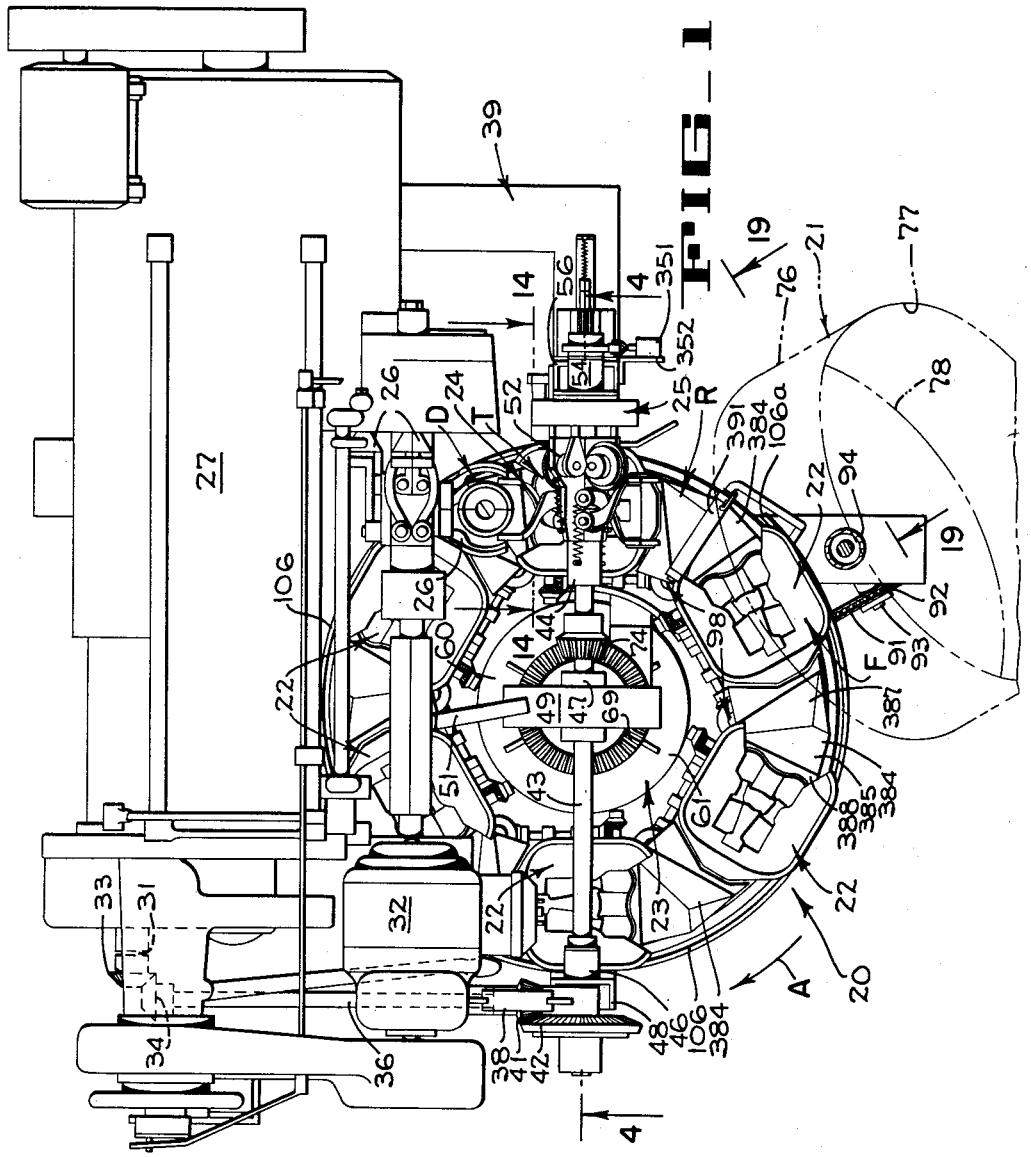
FIG_1
INVENTOR
DONALD W. CHAMBERLIN
BY Hans G. Hoffmeister
ATTORNEY

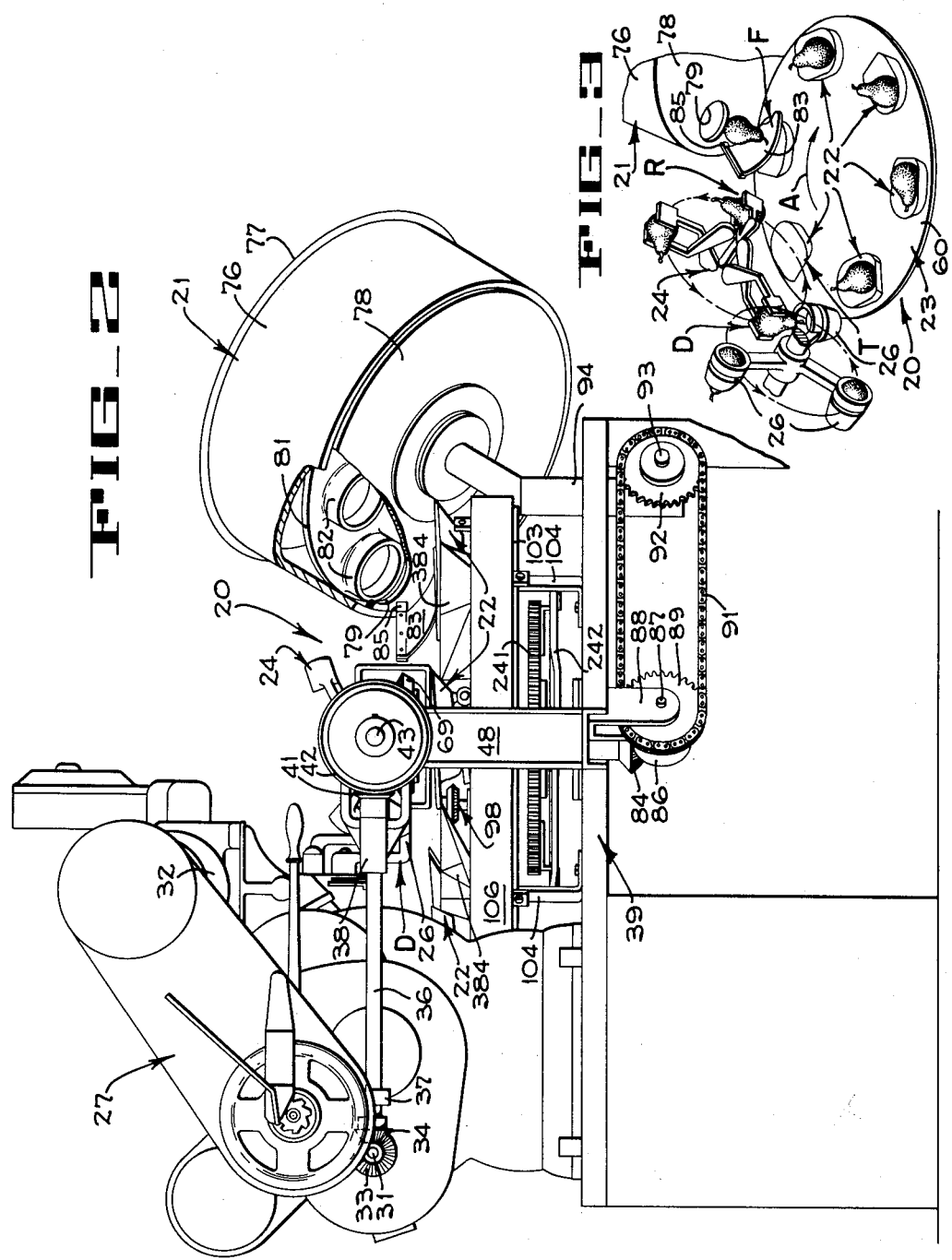

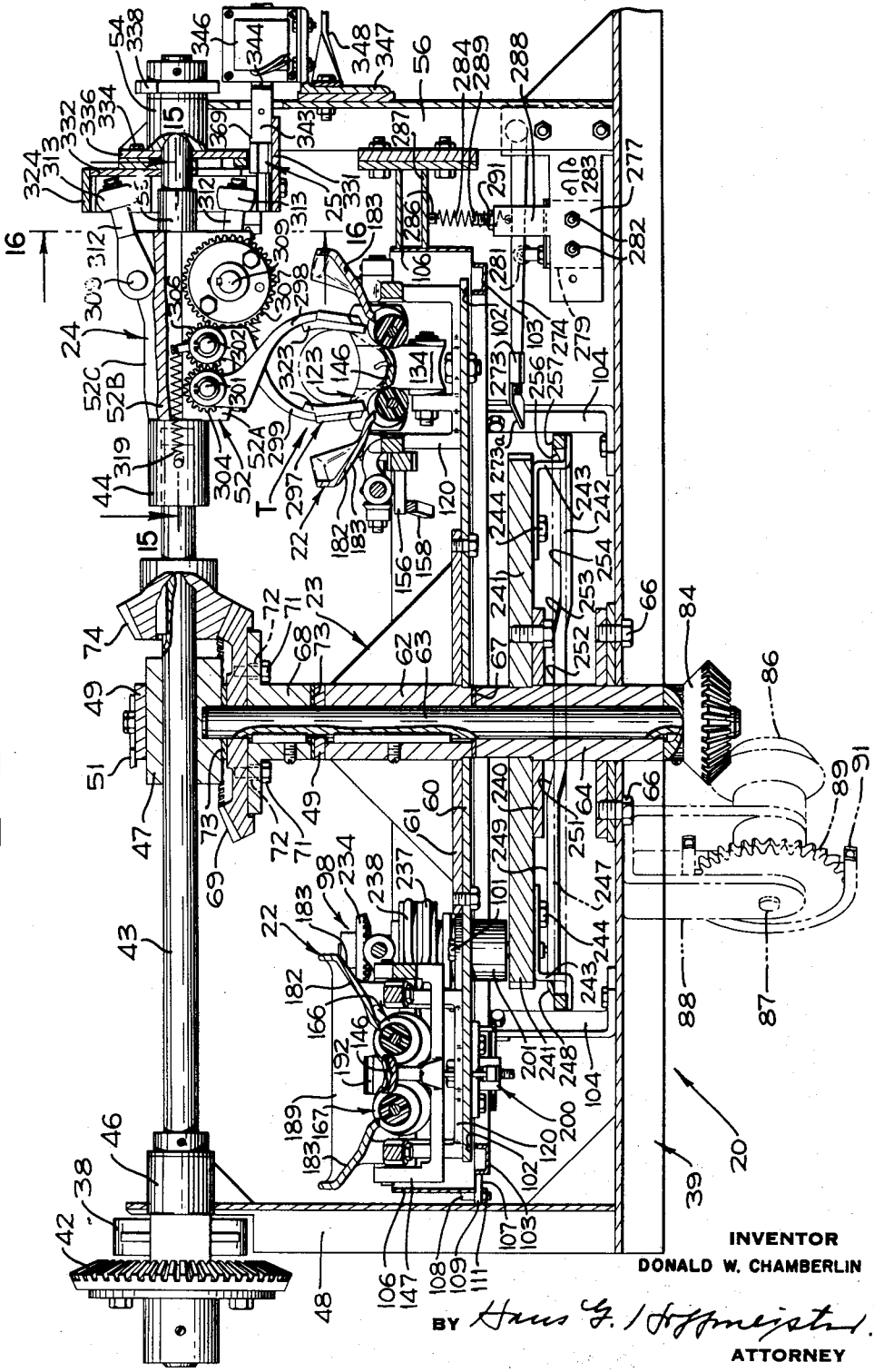

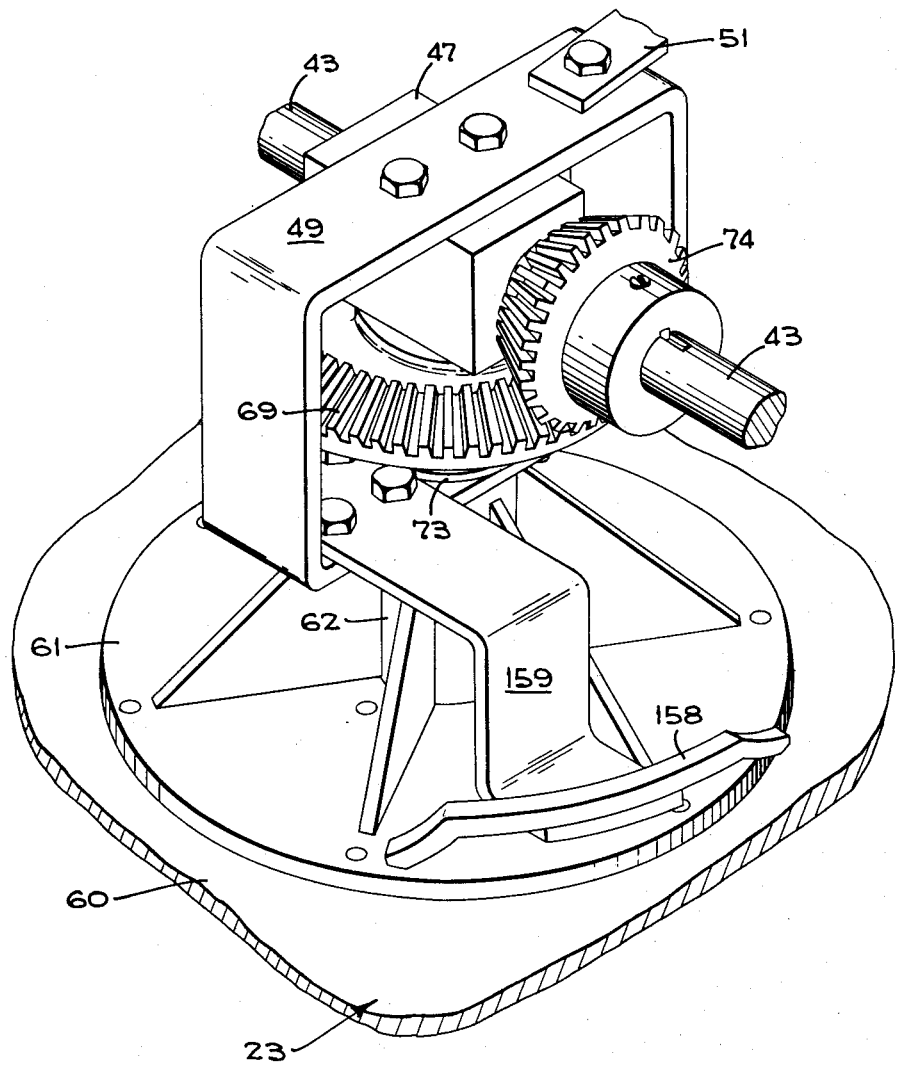
FIG_5

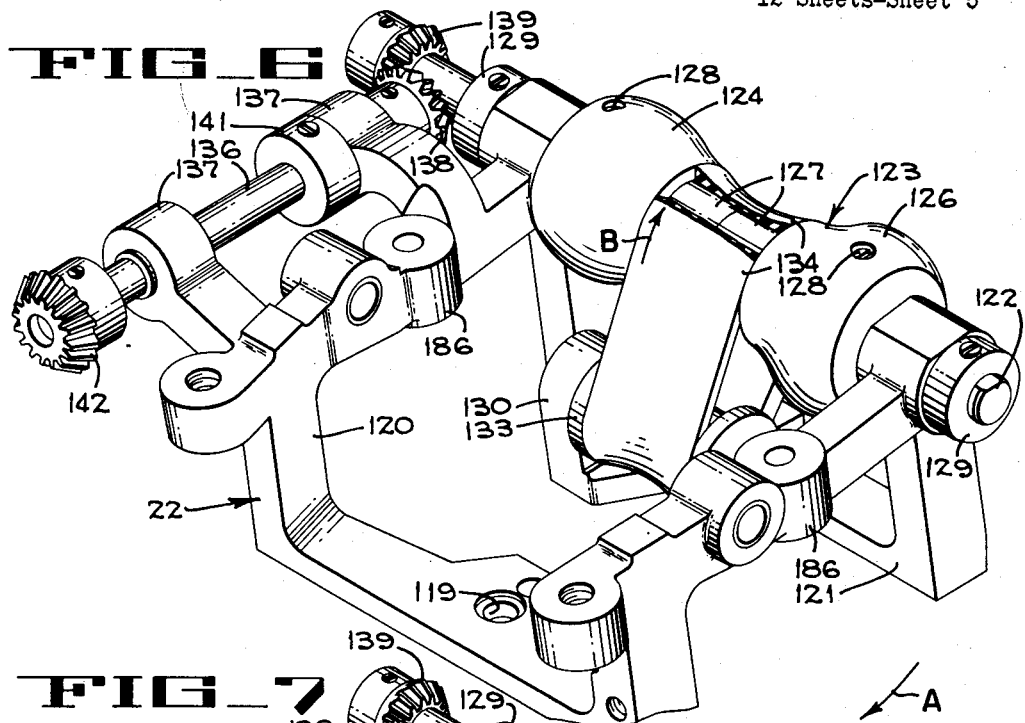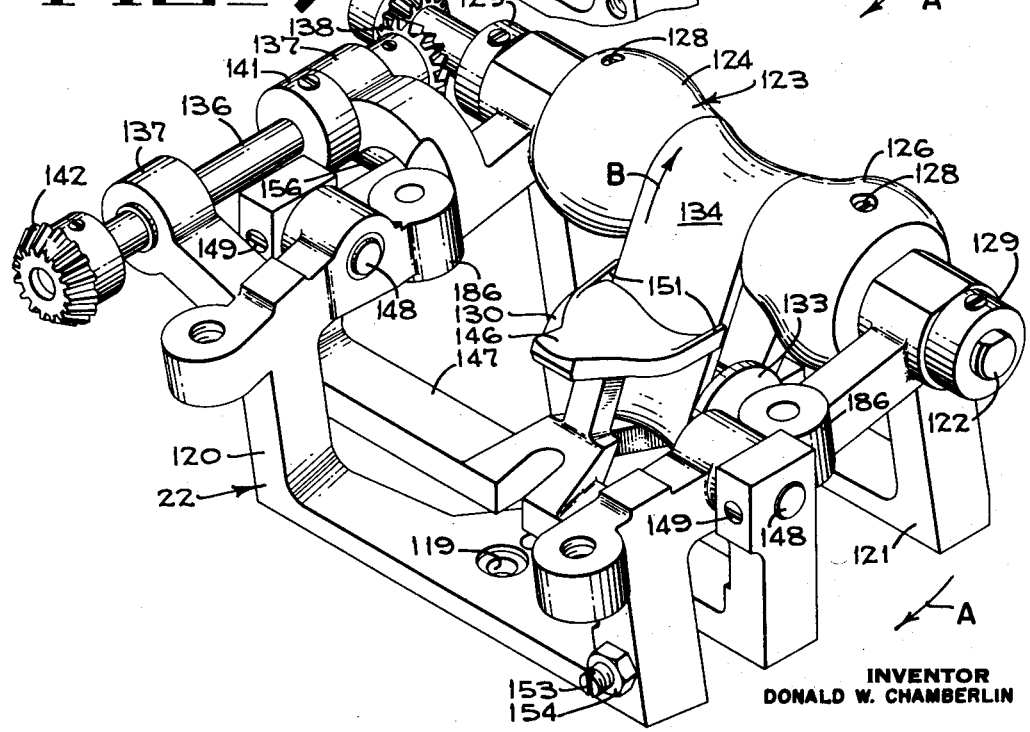

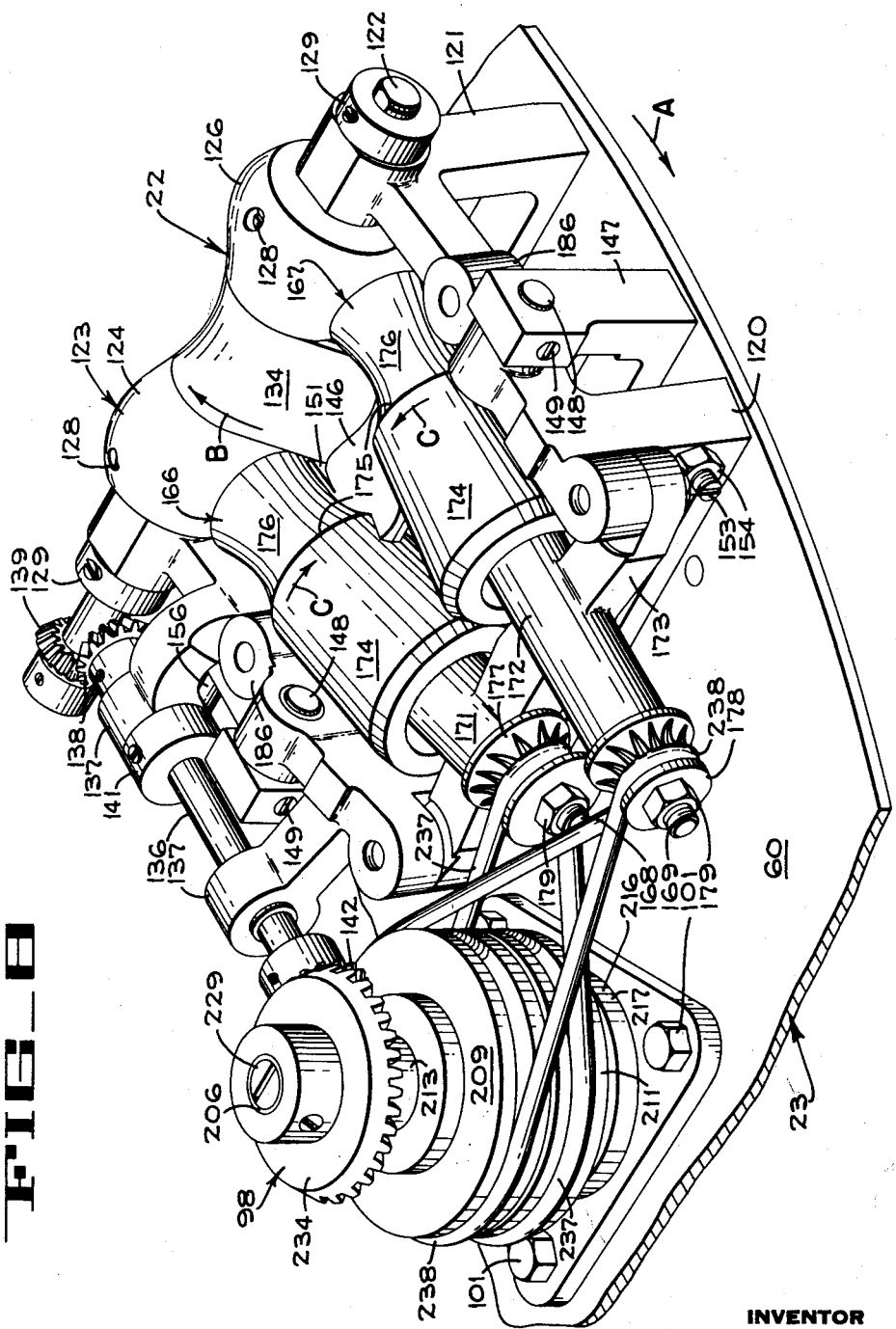

June 16, 1964
D. W. CHAMBERLIN
3,137,383
FRUIT PREPARATION MACHINE
Filed Oct. 10, 1961
12 Sheets-Sheet 7
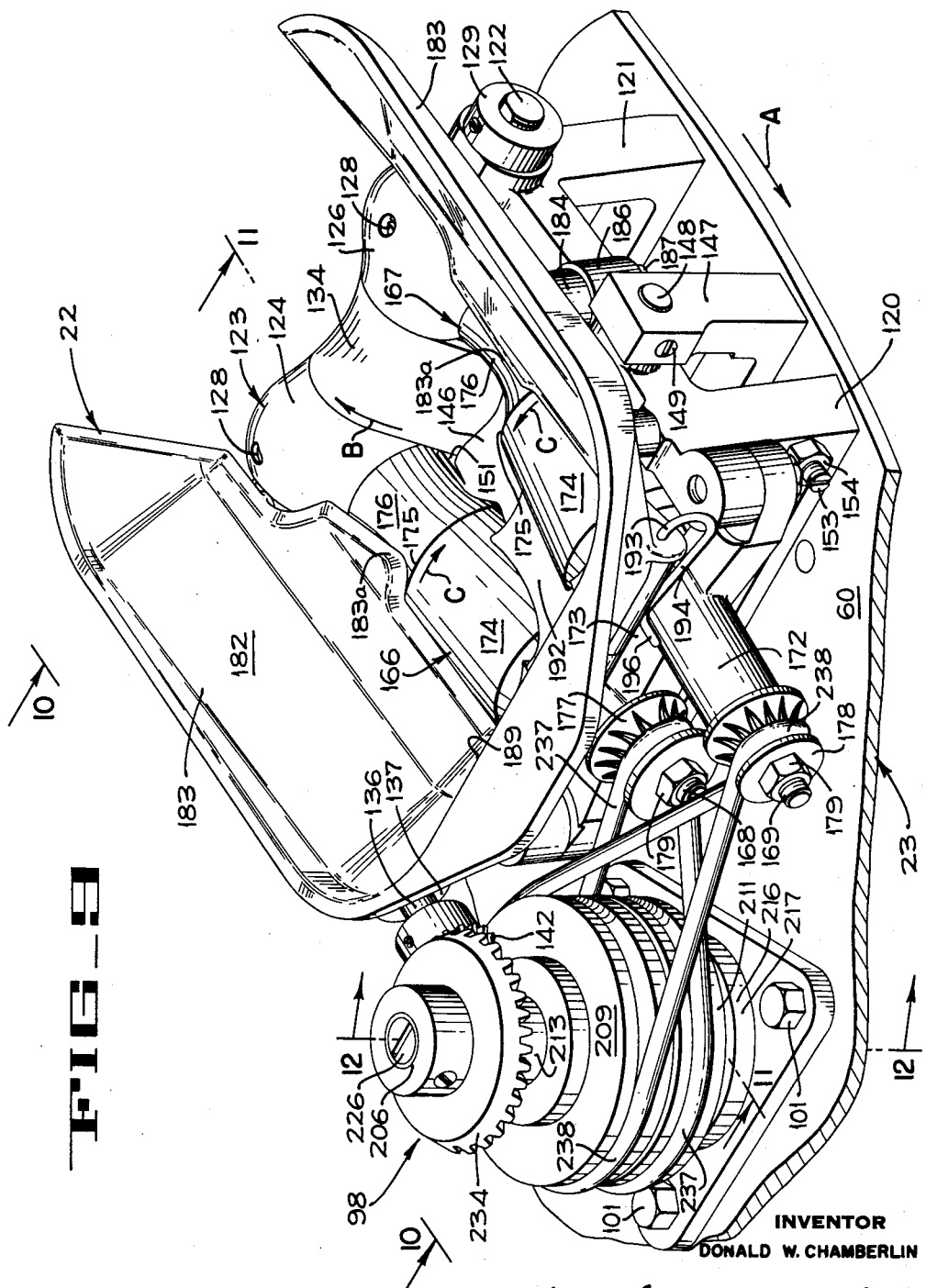
INVENTOR
DONALD W. CHAMBERLIN
BY Hans G. Hoffmeister
ATTORNEY

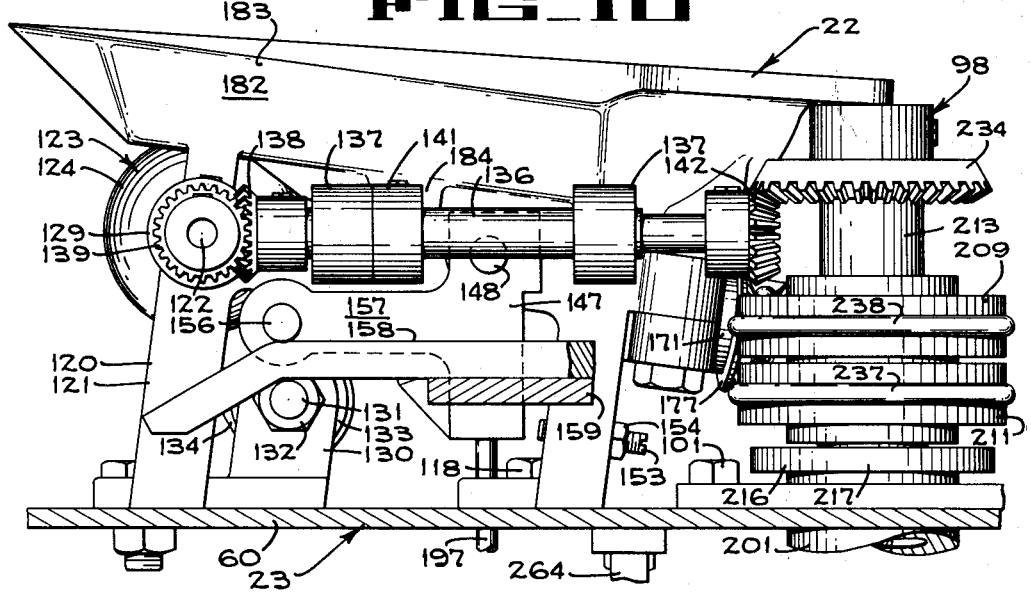
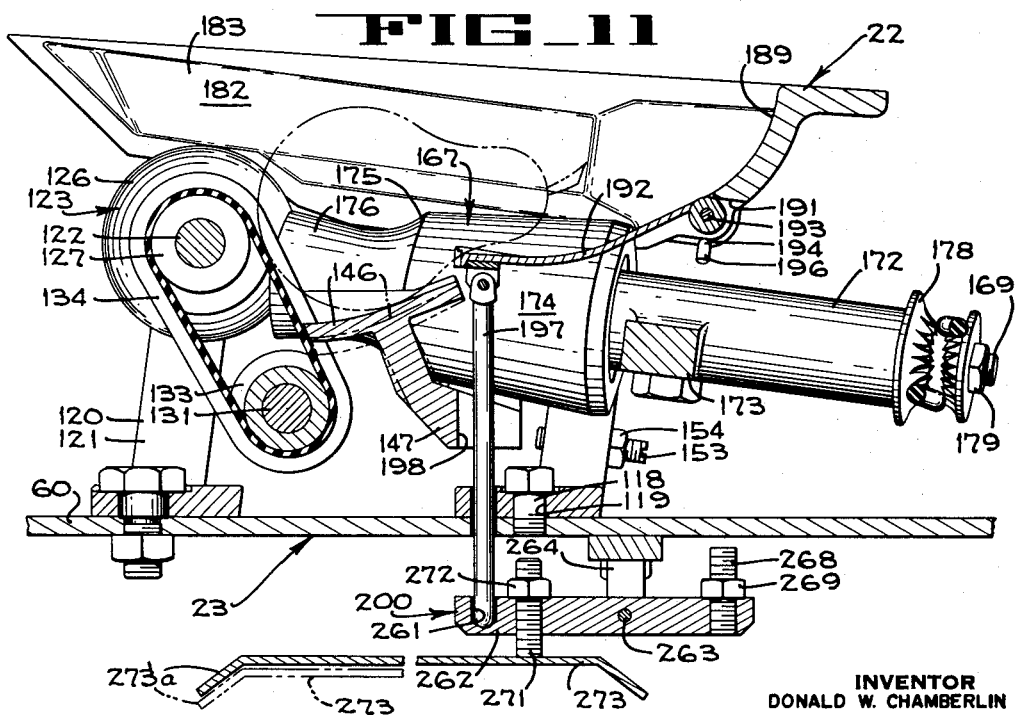

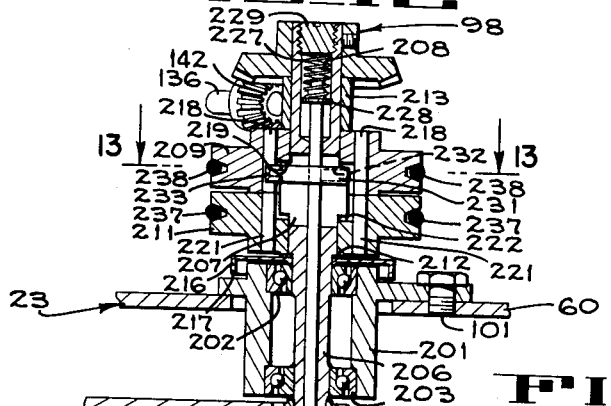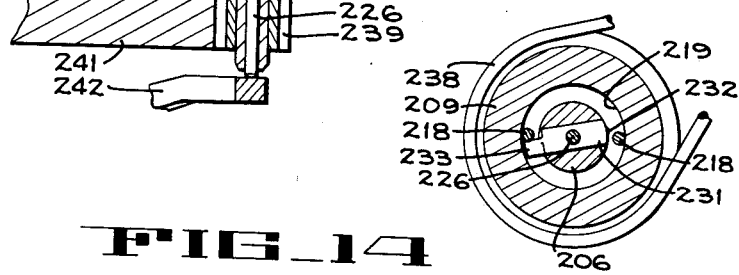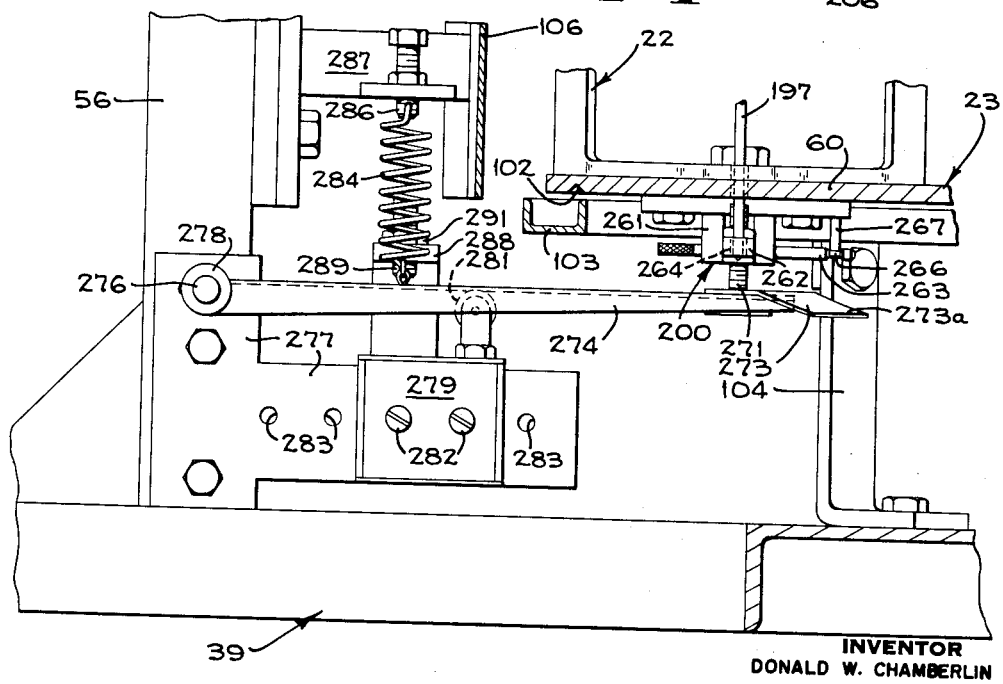

June 16, 1964
D. W. CHAMBERLIN
3,137,383
FRUIT PREPARATION MACHINE
Filed Oct. 10, 1961
12 Sheets-Sheet 10
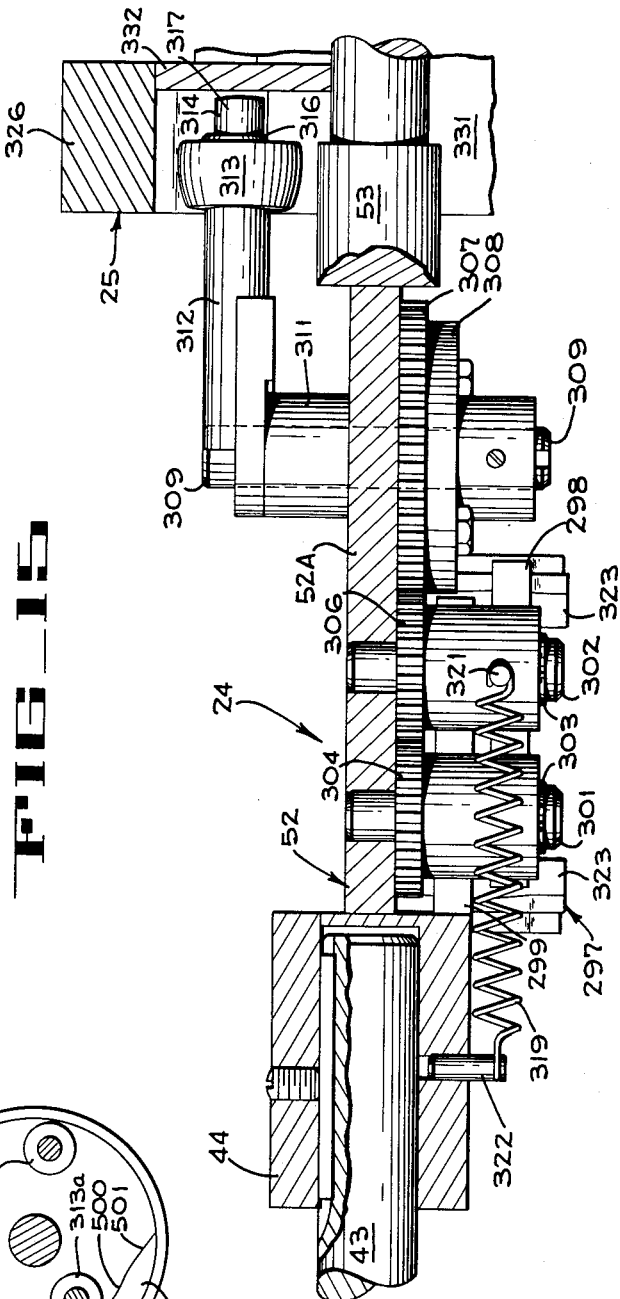
INVENTOR
DONALD W. CHAMBERLIN
BY Hans G. Hofmeister
ATTORNEY June 16, 1964 D. W. CHAMBERLIN 3,137,383
FRUIT PREPARATION MACHINE
Filed Oct. 10, 1961 12 Sheets-Sheet 11
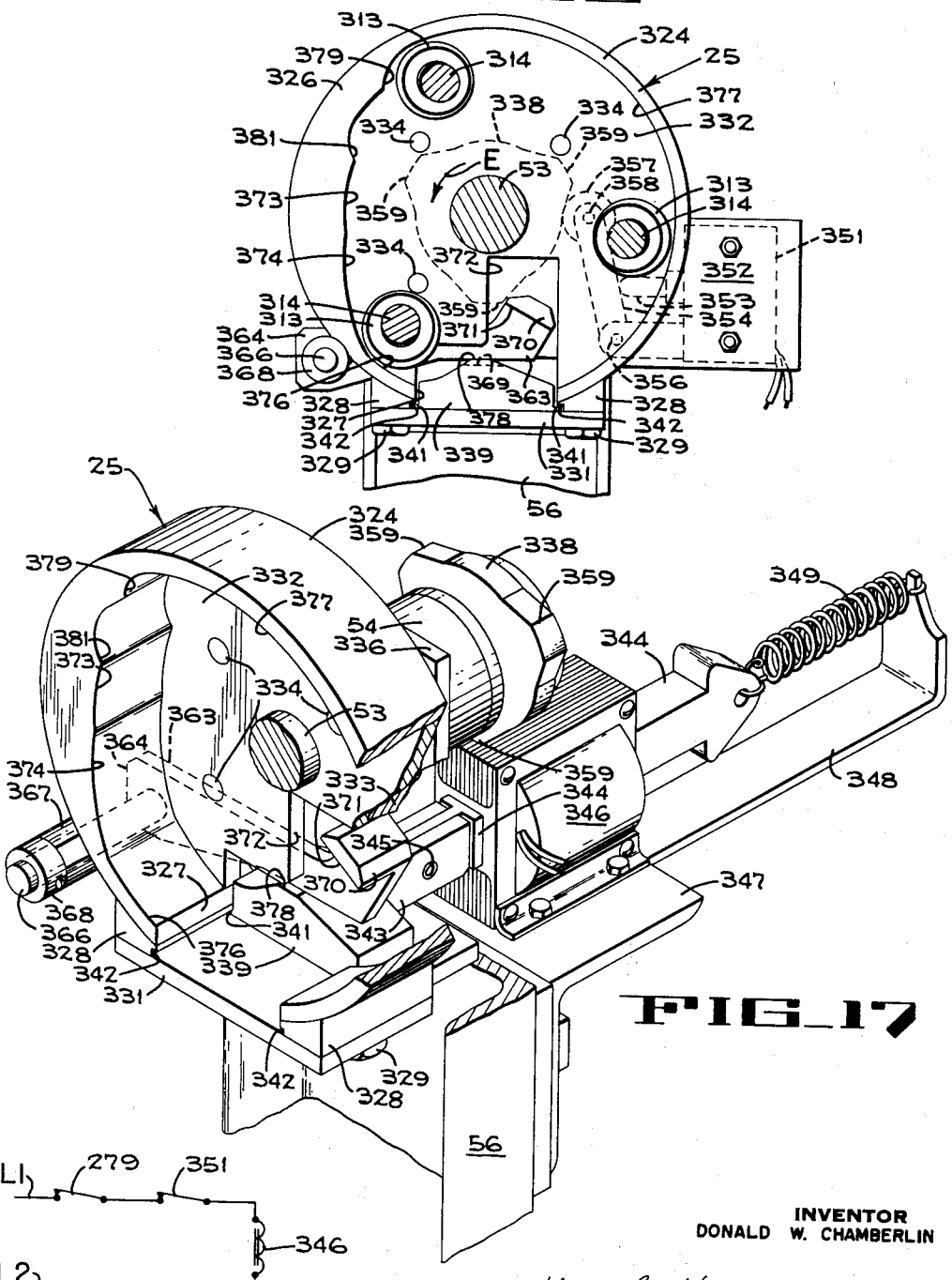
INVENTOR
DONALD W. CHAMBERLIN
BY Hans G. Hofmeister
ATTORNEY June 16, 1964     D. W. CHAMBERLIN     3,137,383
FRUIT PREPARATION MACHINE
Filed Oct. 10, 1961     12 Sheets-Sheet 12
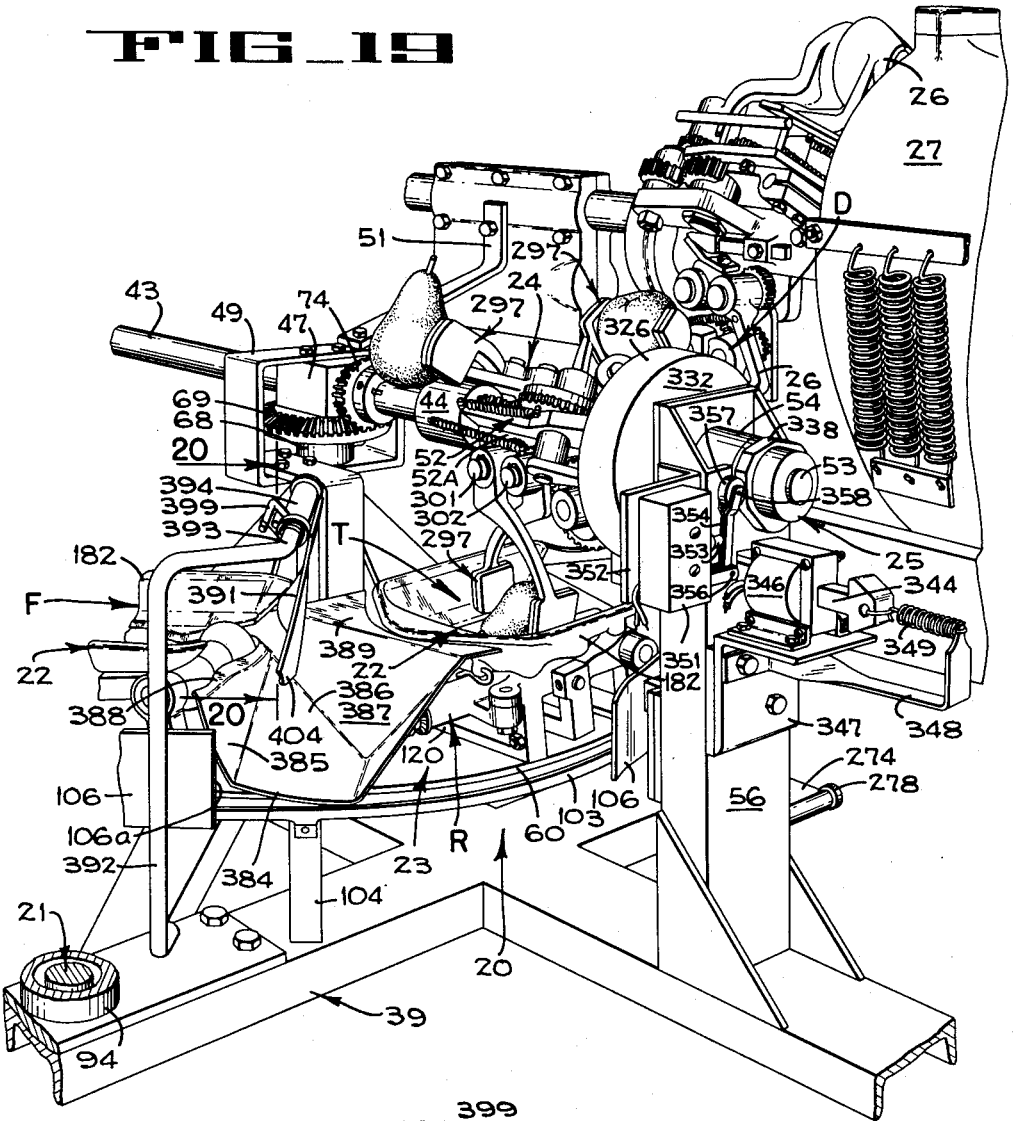
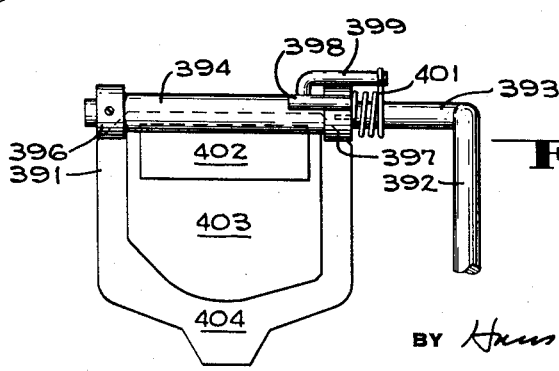
INVENTOR
DONALD W. CHAMBERLIN
BY Hans G. Hofmeister
ATTORNEY United States Patent Office 3,137,383
Patented June 16, 1964

3,137,383
FRUIT PREPARATION MACHINE
Donald W. Chamberlin, Los Gatos, Calif., assignor to FMC Corporation, San Jose, Calif., a corporation of Delaware
Filed Oct. 10, 1961, Ser. No. 144,153
16 Claims. (Cl. 198—33)

The present invention pertains to fruit preparation machines and more particularly relates to an apparatus for orienting ungraded articles, such as pears, and feeding properly oriented articles to a fruit preparation machine.

Fruit such as pears, which must be oriented with their stem ends in a predetermined direction in order to be handled by modern pear preparation machines, have usually been oriented and fed to the machines by hand because the pears tend to vary greatly in size and shape making mechanical orienting and feeding difficult and at times undependable.

It is, therefore, one object of the present invention to provide a dependable pear orienting and feeding apparatus capable of handling ungraded pears as received from the field.

Another object is to provide an orienting mechanism arranged to receive an unoriented pear and to orient the pear with its stem end foremost.

Another object is to provide a pear orienting and feeding apparatus having means for detecting improperly oriented pears and rejecting the same.

Another object is to provide a pear orienting and feeding apparatus arranged to transfer only properly oriented pears to a fruit preparation machine.

Another object is to provide an orienting mechanism having a plurality of elements for rotating a pear and having a transmission for controlling the rotation of certain ones and certain combinations of the elements.

Another object is to provide an apparatus for orienting and feeding pears of various sizes and shapes with a high and equal degree of accuracy and at a relatively high rate.

These and other objects and advantages of the present invention will become apparent from the following description and accompanying drawings, in which:

FIG. 1 is a plan of a pear preparation machine having the pear orienting and feeding apparatus of the present invention associated therewith, certain parts being shown in phantom.

FIG. 2 is an elevation of the left end of the machine of FIG. 1, certain parts being broken away.

FIG. 3 is a diagrammatic perspective showing the cooperative relationship between certain rotary parts of the orienting and feeding apparatus and certain parts of the pear preparation machine.

FIG. 4 is an enlarged vertical section taken along lines 4—4 of FIG. 1, certain drive parts being shown in phantom and certain orienting mechanisms being omitted.

FIG. 5 is an enlarged perspective showing the structure for mounting certain drive and cam parts.

FIGS. 6, 7, 8 and 9 are enlarged perspectives showing progressive stages of assembly of one of the pear orienting mechanisms, with FIG. 9 showing a completed assembly.

FIG. 10 is a side elevation, with parts in section, of one of the pear orienting mechanisms looking in the direction of the arrows 10—10 of FIG. 9.

FIG. 11 is a central vertical section taken along lines 11—11 of FIG. 9.

FIG. 12 is a central vertical section of the transmission taken along lines 12—12 of FIG. 9.

FIG. 13 is a horizontal section taken along lines 13—13 of FIG. 12.

FIG. 14 is an enlarged vertical section of the device for detecting the improperly oriented pears, the section being taken substantially along the lines 14—14 of FIG. 1.

FIG. 15 is an enlarged horizontal section taken along lines 15—15 of FIG. 4 and showing the mounting structure for the transfer mechanism.

FIG. 16 is an enlarged vertical section taken along the lines 16—16 of FIG. 4.

FIG. 17 is an enlarged perspective of the structure shown in FIG. 16.

FIG. 18 is a wiring diagram showing the circuit for the reject mechanism.

FIG. 19 is a perspective looking in the direction of the arrows 19—19 of FIG. 1 and showing a clearing device and discharge trough.

FIG. 20 is an elevation of the clearing device looking in the direction of arrows 20—20 in FIG. 19.

FIG. 21 is a diagrammatic showing of a second embodiment of the fruit rejecting mechanism of the present invention.

The pear orienting and feeding apparatus 20 (FIGS. 1, 2 and 3) of the present invention receives pears at a feed station F from a well known pear feeder 21 which deposits pears one at a time into a plurality of equally spaced orienting mechanisms 22. The orienting mechanisms 22 are mounted on a carrier or turret 23 which is continuously driven in the direction of the arrow A in FIGS. 1 and 3. As the turret moves in a circular path in the direction of arrow A, each pear in its respective orienting mechanism 22 is oriented so that the stem end is foremost and the stem blossom axis is tangent to the circular path of movement of the pear. After the pear is oriented, it is carried to a transfer station T (FIG. 3) where a transfer mechanism 24 grips each pear independently and removes it from its orienting mechanism 22. The transfer mechanism 24 cooperates with a reject mechanism 25 (FIG. 1) and carries the oriented pears past a reject station R. All unoriented pears are discharged from the transfer mechanism at the reject station R, and the remaining properly oriented pears are carried to a discharge station D. Each oriented pear is released from the transfer mechanism and deposited stem end down into one of three fruit supporting cups 26 (FIG. 3) of a pear preparation machine 27 of well known design, which machine peels, cores and performs other desired operations on the pears. The cups 26 are intermittently driven and, during operation, are stopped one by one at the discharge station D of the transfer mechanism.

The pear preparation machine 27 may be of the type disclosed in the United States Letters Patent, No. 2,139,704 which issued to A. R. Thompson et al. on December 13, 1938 and the pear feeder 21 may be of the type disclosed in United States Letters Patent, No. 2,905,216 which issued to M. E. C. Freeman et al. on September 22, 1959.

The drive for the turret 23, the transfer mechanism 24 and the pear feeder 21 includes a shaft 31 (FIGS. 1 and 2) of the pear preparation machine 27 which is continuously driven by the motor 32 by internal drive parts (not shown). A bevel gear 33 keyed to the shaft 31 drives a bevel gear 34 which is keyed to one end of a shaft 36. The shaft 36 is suitably journalled in brackets 37 and 38 which are secured to the machine 27 and to a rigid support frame 39 of the orienting and feeding apparatus 20, respectively.

A bevel gear 41 is keyed to the other end of the shaft 36 and meshes with a large diameter bevel gear 42 which is secured to one end of a shaft 43 which extends radially of the turret 23, as best shown in FIG. 4. The shaft 43 has one end journalled in a bearing 46, and an intermediate portion journalled in a central block 47. The other end of the shaft 43 is received in and is secured to a hub 44 of the transfer mechanism 24. The bearing 46 is secured to the upper end of a vertically extending channel 48 of the frame 39, and the block 47 is bolted to a looped support bracket 49 (FIGS. 1 and 5) which is fixed to a fixed member of the pear preparation machine 27 by a strap 51.

The transfer mechanism 24 includes a rigid Y-shaped member 52 (FIG. 4) which is welded between the hub 44 and a shouldered stub shaft 55 which, in effect, forms an extension of the shaft 43. The Y-shaped member 52 is formed by three plates 52A, 52B and 52C that are welded together and to the hub 44 and shaft 53. The stub shaft 53 is journalled in a bearing 54 which is secured to the upper end of a vertical channel 56 of the frame 39. Since the shaft 53 is, in effect, an extension of shaft 43, the transfer mechanism 24 is driven at the same speed and in the same direction as the shaft 43.

The turret 23 includes a large diameter disc 60 (FIGS. 4 and 5) which is secured by capscrews to a gusseted disc 61 that has a tubular hub 62 keyed to a vertical turret shaft 63 (FIG. 4). Near its lower end, the shaft 63 is journalled in a flanged, tubular bearing bracket 64 which is secured to the frame 39 by capscrews 66. A thrust washer 67 is placed between the hub 62 and the bearing bracket 64 to facilitate rotation between these two parts. A flanged hub 68 is keyed to the upper end of shaft 63 and is secured to a bevel gear 69 by capscrews 71 which extend through arcuate slots 72 in the flange of the hub 68 and are screwed into the bevel gear 69. This arrangement permits angular adjustment of the bevel gear 69 relative to the turret shaft 63 so that the turret 23 may be easily timed with the other cooperating parts of the pear oriening and feeding apparatus 20.

As shown in FIG. 5, the upper end of the turret shaft 63 is journalled in the central bearing block 47. The block 47, the gear 69, the flanged hub 68 and two thrust washers 73 are disposed in stacked relation between two horizontal walls of the looped support bracket 49. It will be apparent that the looped support bracket 49 effectively maintains the bevel gear 69 in engagement with a bevel gear 74 which is keyed to the shaft 43.

The pear feeder 21 (FIG. 2) comprises a stationary inclined cylinder 76 having an open inlet end 77 and an inclined floor 78 which has a single discharge opening 79 near its upper end. A false floor 81, having a plurality of tubular fruit receiving pockets 82 formed adjacent its periphery, is mounted for rotation within the cylinder 76. Rotation of the false floor 81 causes pears, which are fed into the cylinder in bulk from a conveyor or the like (not shown), to be individually picked up by the pockets 82 which carry the pears upwardly until they reach the discharge opening 79 at which time they fall through the opening 79 onto a flexible chute 83, which is made of sheet rubber or the like and is secured to a bracket 85 projecting from the hopper floor 78. Each pear is dropped into the chute and is gently deposited into one of the orienting mechanisms 22 therebelow. A shuffle-type feeder could, of course, be used to feed fruit into the orienting mechanisms 22.

The pear feeder 21 is driven from a bevel gear 84 (FIG. 4) which is keyed to the lower end of the turret shaft 63 and is in driving engagement with a bevel gear 86. The bevel gear 86 is keyed to a shaft 87 that is journalled in a yoke 88 secured to the frame 39. A drive sprocket 89 keyed to the shaft 87 is connected by a chain 91 to a driven sprocket 92 which is keyed to a stub shaft 93. The stub shaft 93 is journalled in a stationary tubular housing 94 which is secured to the frame 39 and to the floor 78 to support the pear feeder 21 in its inclined position. Certain drive parts (not shown) are positioned within the tubular housing 94 and connect the stub shaft 93 in driving engagement wtih the false floor 81.

It will be understood that the above drive mechanisms for the turret, the feed hopper and the transfer mechanism are timed so that the orienting mechanisms 22 are moved progressively into position to receive the pears when the pears are discharged one at a time from a pear feeder 21. Also, the movement of the orienting mechanisms 22 and the fruit supporting cups 26 are timed with the movement of the transfer mechanism 24 so that the mechanism can effect a transfer of the oriented pear from each of the orienting mechanisms 24 to the cups 26.

The disc 60 of the turret 23 carries the several equally spaced orienting mechanisms 22 and several power transmissions 98, one of which is associated with each orienting mechanism. Each power transmission is secured to the disc 60 by capscrews 101 (FIG. 9). An annular groove 102 (FIG. 4) is cut in the bottom of the disc 60 and serves to prevent water, which is used for washing the pears and the orienting mechanisms 22, that flows over the edge of the disc 60 from going toward the center of the turret 23 along the undersurface of the disc 60. The water is collected in an annular channel 103 and is discharged from the channel at any suitable location (not shown). The channel 103 is secured to the frame 39 by a plurality of L-shaped straps 104. A substantially cylindrical guard 106 having an opening 106a (FIG. 1) at the reject station R is connected to the annular channel 103 by a plurality of connectors 107 (only one being shown) each of which includes a threaded stud 108 which is welded to the guard 106, an ear 109 which is welded to the channel 103, and a nut 111 which connects the stud 108 to the ear 109.

Since all the orienting mechanisms 22 and their transmissions 98 are identical, the description of one of each of these units will suffice for all.

The orienting mechanism 22 is shown in progressive stages of assembly in FIGS. 6, 7 and 8, and is shown completely assembled in FIG. 9. The mechanism 22 is advanced in the direction of the arrow A and comprises a one-piece frame 120 (FIG. 6) which has an opening 119 arranged to receive a capscrew 118 (FIG. 11) which locks the unit on the turret disc 60. The frame 120 has a U-shaped rearward end 121 (FIG. 6) which rotatably supports a transversely extending rear orienting roller shaft 122. The rear orienting roller 123 is constructed in two halves comprising two identical spaced bulbous end portions 124 and 126 of generally truncated spherical form, and two inner end portions which define a cylindrical belt drive roller 127 (FIG. 11). The two halves of the roller 123 are secured to the shaft 122 as by set screws 128 (FIG. 6). Collars 129 are locked to the shaft 122 and prevent axial movement thereof in the frame. The U-shaped member 121 of the frame 120 has an upwardly directed ear 130 (FIG. 10) which is arranged to receive a bolt 131 that is parallel to the shaft 122 and is locked to the ear 130 by a nut 132. A cylindrical roller 133 is journalled on the bolt 131 and cooperates with the drive roller 127 to receive an orienting belt 134 (FIG. 11) which is inclined downwardly and forwardly and is concave in transverse section. The orienting roller drive shaft 122 is driven by a drive shaft 136 (FIG. 6) which is journalled in bushed ears 137 that project outwardly from one side of the frame 120. A bevel gear 138 is secured to one end of the drive shaft 136 and meshes with a bevel gear 139 which is locked to the shaft 122. Axial movement of the drive shaft 136 is prevented by the bevel gear 138 and by a set collar 141 which are locked to the drive shaft 136 closely adjacent opposite sides of the bushing in one of the ears 137. A bevel gear 142, secured to the other end of the drive shaft 136, is continuously driven by the transmission 98, in a manner to be described presently, causing the orienting belt 134 and the rear orienting roller 123 to move in the direction of the arrow B (FIGS. 6 to 9).

A bridge 146 (FIGS. 7 and 11) is provided in the orienting unit to fill the opening immediately in front of the belt 134. If a pear drops into the unit in such a manner that the stem end engages the bridge 146, the bridge guides the stem end into contact with the belt which raises the stem end and starts it moving toward the oriented position shown in phantom lines in FIG. 11. The bridge 146 is formed as an integral part of a U-shaped support 147 which is mounted for pivotal movement on the frame 120 by means of pins 148 which are secured by setscrews 149 to the support 147 and are journalled in bushed holes in the frame 120. The bridge 146 has a generally concave upper surface which conforms to the shape of the blossom end of a pear. The rear edge of the bridge conforms to the shape of the belt 134 and includes vertical fins 151 which extend rearwardly adjacent either side of the orienting belt 134.

The bridge 146 is normally held by gravity in its lower position as shown in dotted lines in FIG. 11. In this position the U-shaped support 147 engages a stop screw 153 which is threaded in one leg of the frame 120 and is locked in place by a lock nut 154. The bridge is raised to its upper, full line position by means of a pin 156 (FIGS. 7 and 10) which projects laterally from an actuating arm 157 that is integral with the U-shaped support 147. When the unit approaches the transfer station T, the pin 156 rides upwardly along an arcuate cam track 158 (FIGS. 5 and 10). The cam track 158 is welded to a Z-shaped strap 159 which is bolted to the looped support bracket 49. When the bridge 156 is raised to its upper position, the pear is moved to a position in which it can be easily grasped by the transfer mechanism 24.

As best shown in FIG. 8, two side rollers 166 and 167 are mounted on shafts 168 and 169, respectively, which are journalled in elongated bushings 171 and 172, respectively. The bushings 171 and 172, are formed as an integral part of a bracket 173 which extends transversely across and is bolted to the forward end of the frame 120. The axes of the shafts 168 and 169 converge at the forward end of the orienting mechanism 22 and are inclined forwardly and downwardly from the rear shaft 122. Each side roller 166 and 167 includes a frusto-conical forward portion 174 and a concave rear portion 176 which conforms to the shape of the blossom end of the pear. The side edges of the bridge 146 conform to the shape of the rear portions of the rollers 166 and 167 and lie closely adjacent thereto. The rearward ends of the rollers 166 and 167 are concave so as to permit a portion of the bulbous ends 124 and 126, respectively, of the rear roller 123 to pass therethrough. In this way, the clearance between the ends of the rollers 166 and 167 and the bulbous ends 124 and 126 is reduced to a minimum. The forward ends of the shafts 168 and 169 are shouldered and threaded to receive pulleys 177 and 178, respectively, said pulleys being locked in place on the shafts by nuts 179.

It will now be apparent that an aligning cavity is formed between the rollers 166 and 167 and that the slope of the roller portions 174 and the angle of divergence of the rollers is such that fruit will be drawn into aligning cavity. Further, the concave roller portions 176 are so curved relative to the conical roller portions 174 that an annular ridge 175 is formed between the two portions of each roller, and a generally spherical chamber is defined by the two roller portions 176 and the belt 134.

The completed orienting mechanism 22 (FIGS. 9, 10 and 11) includes a fruit receiving U-shaped dish 182 which is contoured to aid feeding and to permit freedom of fruit movement during the orienting operation. Each side wall 183 of the dish 182 is provided with a downwardly projecting threaded boss 184 (only one being shown in FIG. 9) which rests on and is secured to an apertured boss 186 of the frame 120 by a cap screw 187. The rear of the dish 182 is open for reasons soon to be made apparent. The bottom of the dish is also open and the side walls 183 are shaped to deflect the pear inwardly. The lower edge of each wall 183 is shaped to lie closely adjacent, and to conform to the contour of the nearest side roller 166 or 167, and the adjacent bulbous end portion 124 or 126 of the rear roller 123, as best shown in FIGS. 4 and 9. A tab portion 183a on the lower end of each wall 183 provides a support surface on which the stem end of a laterally oriented pear may roll as it moves forwardly toward rollers 174.

The forward end wall 189 of the dish 182 is provided with a notch 191 (FIG. 11) which is centered laterally of the orienting mechanism 22 and receives the forward end of a nose stop 192 which supports the stem end or nose of a pear when the pear is properly oriented.

The nose stop 192 (FIGS. 9 and 11) is pivoted about a pivot leg 193 of a spring clip 194, which leg 193 is slidably received in a pair of aligned holes in the forward wall 189 of the dish 182. The other leg 196 (FIG. 9) of the spring clip 194 is urged against the outer surface of the dish and serves to lock the clip 194 in operative position.

The nose stop 192 curves downwardly from its forward end and has a shallow concave longitudinal configuration. The rear end of the nose stop is disposed between and closely adjacent the frusto-conical portions of the side rollers 166 and 167 as seen in FIGS. 1, 9 and 11. The rearward end of the nose stop 192 is pivotally connected to a detector pin 197 of a detecting device 200. The pin extends downwardly through a slot 198 in the U-shaped bridge support 147 and through holes in the frame 120 and in the turret disc 60. When a pear in the orienting mechanism becomes properly oriented, its stem end rests on the nose stop 192 and applies a downward force on the detector pin 197 to cause actuation of a control mechanism, which will be described presently, that causes the transfer mechanism 24 (FIG. 3) to transfer the pear from the orienting mechanism 22 to one of the fruit supporting cups 26.

The transmission 98 is arranged to drive the rear roller 123 continuously and the side rollers 166 and 167 either together or separately. The transmission 98 (FIGS. 9, 12 and 13) comprises a flanged bearing housing 201 which supports two bearings 202 and 203 (FIG. 12) and is bolted to the turret disc 60 by the cap screws 101. A tubular shaft 206 is journalled in the bearings 202 and 203 and has a transverse slot 207 near its midpoint and a threaded counterbore 208 in its upper end. Side roller drive sheaves 209 and 211 are independently journalled on the shaft 206. The drive sheaves 209 and 211 are held from axial movement by a thrust washer 212 and a spacer 213. The thrust washer 212 is disposed between a flange on the drive sheave 211 and a bearing cover 216 which engages the inner race of the bearing 202 and includes a skirt 217 that prevents water from contacting the bearings 202 and 203. The spacer 213 is disposed between the drive sheave 209 and a bevel gear 234.

The drive sheave 209 has a pair of diametrically opposed hardened drive pins 218 press fitted therein. The pins 218 project into a large diameter counterbore 219 (FIGS. 12 and 13) in the sheave 209. Similarly, the drive sheave 211 has a pair of diametrically opposed hardened drive pins 221 press fitted therein and projecting into a counterbore 222 in the sheave 211. When the pins 218 and 221 are aligned as shown in FIG. 12, their free ends are disposed closely adjacent each other.

A shifting rod 226 is slidably mounted within the tubular shaft 206 and has its lower end projecting from the lower end of the shaft 206. The rod 226 is urged downwardly by a spring 227 which is disposed between a collar 228 locked on the upper end of the shifting rod 226 and a set screw 229 screwed into the counterbore 208 in the shaft 206. A drive dog 231 (FIGS. 12 and 13) is locked to the shifting rod 226 by a set screw 232 and is moved vertically within either of the counterbores 219 and 222 when the rod 226 is moved up or down. The drive dog 231 has an end portion 233 which is disposed in position to be moved to a lower position in engagement with one of the pins 221, to an upper position in engagement with one of the pins 218, or to an intermediate position in engagement simultaneously with one of each of the pins 218 and 221.

As previously mentioned, the rear orienting roller 123 (FIG. 9) and belt 134 are driven continuously by the transmission 98. The bevel gear 234 is keyed to the shaft 206 and is in driving engagement with the bevel gear 142 (FIG. 10) to effect the driving of the rear roller and belt. The spacer 213 (FIG. 12) is disposed between the bevel gear 234 and the drive sheave 209 to provide the proper spacing therebetween. The pulley 177 (FIG. 9) of the side roller 166 is connected to the sheave 211 by a belt 237, and the pulley 178 of the side roller 167 is connected to the sheave 209 by a belt 238 to effect driving of the side rollers 166 and 167.

The shaft 206 (FIG. 12) of the transmission 98 is continuously driven by a pinion 239 which meshes with a large diameter, continuous stationary gear 241. The gear 241 (FIG. 4) is bolted to a flange 240 which is fixed to the tubular bearing bracket 64. Since the pinions 239 (FIG. 12) of each transmission 98 are considerably smaller than the stationary gear 241, it will be apparent that the transmission shafts 206 will rotate many times for each revolution of the turret 23.

In order to move the shifting rod 226 (FIG. 12) vertically so as to shift the drive dog 231 between positions in which the dog will drive both side rollers 166 and 167 together or will drive either of the side rollers independently of the other, an annular cam 242 is provided. The cam 242 is secured to brackets 243 (FIG. 4) which are connected to the stationary gear 241 by bolts 244. The cam 242 is stationary and includes a section 247 of intermediate height which extends 195 degrees in a clockwise direction when looking down on the turret 23 and when starting from a point directly below the transfer station T. During its travel on the cam section 247, the shifting rod 226 holds the dog 231 (FIG. 12) in position to simultaneously engage one of the pins 218 and one of the pins 221 thereby driving both side rollers 166 and 167 in the direction of the arrows C (FIG. 9). The next 10 degree section 248 of the cam is directed upwardly to a raised section 249 which extends 50 degrees and moves the shifting rod 226 upwardly so that the dog 231 (FIG. 12) engages only one of the pins 218 and accordingly drives only the side roller 167. A downwardly inclined section 251 (FIG. 4) extends for 5 degrees and communicates with an intermediate section 252 which extends through an arc of 30 degrees thereby again driving both side rollers 166 and 167. The next 5 degrees of the cam 242 is a downwardly inclined section 253 which leads into a low section 254 that allows the spring 227 (FIG. 12) to move the shifting rod 226 downwardly so that the dog engages one of the pins 221 in the roller drive sheave 211 which drives the roller 166. An upwardly inclined section 256 (FIG. 4) of the cam extends for 10 degrees and leads into a 5 degree intermediate section 257 which leads into and is a continuation of the previously described 195 degrees intermediate section 247.

With this cam arrangement it can be seen that the back roller 123 is continuously driven at all times and that both side rollers are driven immediately after the pear is received in the orienting mechanism. Thereafter, the side roller 167 and back roller 123 only are driven, the three rollers are next driven, then the side roller 166 and back roller 123 are driven, and immediately before the pick-up operation all three rollers are again driven.

As previously mentioned, when a pear becomes properly oriented in its orienting mechanism 22 (FIG. 11), the stem end of the pear is stopped from further movement by the nose stop 192 and applies an added downward force to the nose stop and the detector pin 197 of the detector device 200. The lower end of the detector pin 197 is received in a notch 261 in a rocker bar 262 (FIGS. 11 and 14). The rocker bar 262 is pivoted about a pin 263 which is supported in a yoke 264 bolted to the undersurface of the turret disc 60. Thus the pin 197 normally assumes the lowered position but it can be moved upwardly, as bar 262 pivots about pin 263, to the position shown in full lines in FIG. 11 unless the weight of the stem end of a pear holds the pin 197 in the lowered position.

As shown in FIG. 14, the pin 263 is elongated and has a circumferential groove 266 near one end which cooperates with a vertical stop ear 267 that is welded to the yoke 264 and prevents axial movement of the pin 263. By gripping a knurled end of the pin 263, an operator can easily move the pin axially causing the pin to deflect slightly so that the groove 266 can be moved into or out of locking engagement with the ear 267. A threaded stud 268 (FIG. 11) is screwed in one end portion of the rocker bar 262 and is locked in place by a lock nut 269. The stud 268 acts as an adjustable stop to define the position the bar 262 normally assumes due to the weight of pin 197 and the associated linkage. A detector pin actuating stud 271 is screwed into the rocker bar 262 near the other end thereof and is locked in adjusted position by a lock nut 272.

As each orienting mechanism 22 (FIG. 4) approaches the transfer station T, the associated pin actuating detector stud 271 contacts and rides along the upper surface of an arcuate detector switch cam 273 which has a downwardly slanted entrance end 273a. The arcuate cam 273 (FIGS. 4 and 14) is welded to the free end of an arm 274 which is pivoted at the other end on a stub shaft 276 which is rigid with and projects outwardly from a bracket 277 that is bolted to the frame 39 of the pear orienting and feeding apparatus. A set collar 278 (FIG. 14) is locked on the stub shaft 276 and prevents disengagement of the arm 274 from the stub shaft 276. A normally closed switch 279 having an actuating element 281 positioned against the undersurface of the arm 274 is connected to the bracket 277 in any of several possible positions by bolts 282 which extend through certain ones of a plurality of holes 283 in the bracket 277. The arm 274 is urged upwardly by a spring 284 which is connected to the arm and to a pin 286. The pin 286 is secured to a bracket 287 that is bolted to the frame 39 and aids in supporting the guard 106. The bracket 277 includes a horizontal portion 288 which projects over the arm 274 and has a stud 289 screwed therein and acts as an adjustable stop which terminates upward movement of the arm 274 and the detector switch cam 273. A lock nut 291 is screwed on the stud 289 and locks the same in adjusted position.

It will be understood that the spring 284 is of sufficient strength to hold the arm 274 and the cam 273 in their upper position indicated in solid line of FIG. 11. When a pear is not properly oriented in the orienting mechanism 22, the spring loaded cam 273 will pivot the bar 262 to the position of FIG. 11 to raise pin 197. Accordingly the switch 279 (FIG. 14) will not be actuated. When a pear is properly oriented in the mechanism 22, the nose of the pear will bear against the nose stop 192 with sufficient force to hold the stud 271 in the path of cam 273 so that the cam 273 will be moved downwardly to the phantom line position of FIG. 11 to open the normally closed switch 279 which actuates certain parts soon to be described.

The transfer mechanism 24, best shown in FIGS. 1, 4, 15 and 19, removes the oriented pears from their associated orienting mechanisms 22 and places them in the fruit supporting cups 26 of the pear preparation machine 27 while cooperating with the reject mechanism 25 to discharge the improperly oriented pears prior to their arrival at the cups 26.

As previously mentioned, the transfer mechanism 24 includes a rigid Y-shaped member 52 which is welded between th hub 44 and the stub shaft 53, the hub 44 being connected to and continuously rotated by the shaft 43. Each of the three equally spaced radially extending plates 52A, 52B and 52C of member 52 supports a fruit gripping mechanism 297 and, since the several mechanisms 297 are identical, the description of one will suffice for all.

Each gripping mechanism 297 (FIGS. 4 and 15) includes a pair of gripping arms 298 and 299 having jaws on their free ends. The arms 298 and 299 are pivotally journalled on pins 301 and 302, respectively, which are rigidly secured to the plate 52A. The arms are retained on their associated pins by snap rings 303. Gears 304 and 306 are secured to the hubs of the gripping arms 298 and 299, respectively, and are in mesh, thereby assuring that both arms will move equal amounts in opposite directions. A large diameter gear 307 meshes with the gear 306 and is bolted to a flanged hub 308 which is keyed to a shaft 309. The shaft 309 extends through plate 52A and is journalled in a hub 311 (FIG. 15) welded to the plate 52A and has an actuating arm 312 keyed thereto. A cam follower 313 is journalled on a reduced diameter cylindrical portion 314 of the arm 312 and is held in place by a snap ring 316. It is to be noted that the end 317 of the arm 312 projects a substantial distance outwardly of the cam follower 313. A spring 319 is connected between a pin 321 on the arm 299 and a pin 322 on the hub 44, and normally urges the fruit gripping jaws of the arms 298 and 299, which jaws are covered with resilient pads 323, toward each other. The cam follower 313 rides in a drum cam 324 which controls the opening of the arms 298 and 299.

A drum cam 324 is a part of the reject mechanism 25 which effects the rejection of all unoriented pears from the gripping mechanism 297 prior to their arrival at the discharge station D (FIG. 3). The drum cam 324 (FIGS. 16 and 17) is in the form of a cylindrical segment 326 which is open at 327 and has end portions at the opening 327 that are welded to mounting blocks 328. The blocks 328 are secured by bolts 329 to a horizontal plate 331 which is secured as by welding to the vertical channel 56 of the frame 39. An apertured back plate 332 (FIG. 4) is welded to the cylindrical segment 326 and, likewise, an apertured spacer 333 is welded to the back plate 332. Cap screws 334 which extend through a plate 336, which is welded to the bearing 54 and to the vertical channel 56, are screwed into threaded holes in the spacer 333 and back plate 332 to aid in rigidly supporting the cylindrical segment 326 of the drum cam 324. The shaft 53 extends through the back plate 332, the spacer 333, the plate 336, and the bearing 54 and has a timing cam 338 secured on the end thereof.

A reject cam segment 339 (FIGS. 16 and 17) is mounted for sliding movement on the plate 331 axially of the shaft 53. When the reject segment 339 is moved to the left (FIG. 17) in the opening 327 of the cylindrical segment 326, a cam follower 313 passing thereover, will effect opening of the associated gripping mechanism 297 (FIG. 4) to release the gripped pear prior to its arrival at the discharge station D (FIG. 3). The reject cam segment has lips 341 projecting outward from the sides thereof, which lips 341 are received in slots 342 formed in the blocks 328 and serve to guide the rejecting segment 339 in its axial movement. A yoke 343 (FIG. 17) is formed integrally on the reject cam segment 339 and is secured to one end of the actuating element 344 of a solenoid 346 by a pin 345. The solenoid 346 is bolted to an angle bracket 347 which, with a spring attachment arm 348, is bolted to the vertical channel 56 as best shown in FIG. 4. A spring 349 (FIG. 17) is connected between the other end of the yoke actuating element 344 and the spring attachment arm 348 and normally urges the actuating element 344 and the attached reject cam segment 339 to the right as viewed in FIG. 17.

A normally open timing switch 351 (FIGS. 1 and 16) is bolted to a bracket 352 which is secured to the vertical channel 56. The switch 351 includes an actuating element 353 (FIG. 16) which is actuated by a link 354 that is pivoted to the body of the switch 351 by a pin 356. The link 354 has a cam follower 357 pivoted to the other end thereof by a pin 358. The cam follower 357 engages the peripheral surface of the timing cam 338 which includes three equally spaced lobes 359 each of which cooperates with one of the gripping mechanisms 297 and closes the switch 351 each time the cam follower 357 is engaged by one of the lobes 359.

As shown in the wiring diagram of FIG. 18, the switch 279, associated with the orienting unit, and switch 351 are in series with the solenoid 346 and receives power from lines L1 and L2. The normally open timing switch 351 is closed each time the cam follower 357 (FIG. 16) engages one of the lobes 359, and the normally closed orientation detecting switch 279 is open only when a pear is properly oriented with the stem of the pear on the nose stop 192 (FIG. 11). Thus, the solenoid 346 is energized each time one of the orienting mechanisms 22 approach the transfer station T (FIG. 4) and does not have the stem end of a pear resting on the nose stop 192. Energization of the solenoid moves the reject cam segment 339 into its operative position in the open space 327 of the cylindrical cam segment 326.

Upon each energization of the solenoid 346 and movement of the segment 339 into its operative position, a latch 363 (FIGS. 16 and 17) drops behind the segment 339 and locks it in the operative position until the cam follower 313 of the effected fruit gripping unit 297 (FIG. 4) advances therepast and unlatches the latch 363, at which time the spring returns the reject cam segment 339 into its inoperative position shown in FIG. 17.

The latch 363 comprises a latch arm 364 which is secured at one end to a shaft 366 that is journalled in a sleeve 367 welded to the outer surface of the cylindrical segment 326. A set collar 368 secured to the shaft 366 prevents disengagement of the shaft 366 from the sleeve 367. The latch arm 364 normally rests on the upper surface of the reject cam segment 339. When the solenoid 346 is actuated, the segment 339 slides under the latch arm 364 until the latch arm gravitates behind an abutment 369 (FIGS. 4 and 16) on the reject cam segment 339 and, accordingly, prevents the return of the segment 339 to the right (FIGS. 4 and 17) when the solenoid is deenergized.

In order to unlatch the latch 363, an arm 370 is formed on latch 363 to project through an opening 372 in plate 332. An inclined surface 371 (FIGS. 16 and 17) is formed on latch arm 370 and is disposed in position to be contacted by the end 317 (FIG. 4) of the cam follower arm 312 which controls the opening of the particular gripping mechanism 297 that is being opened by the reject cam segment 339. The end of the arm 312 contacts and lifts the latch arm 364 from behind the abutment 369 thereby allowing the spring 349 to return the reject cam segment 339 to its inoperative position shown in FIG. 17.

As indicated in FIGS. 4 and 16, when one of the gripping mechanisms 297 is directed vertically downward its trailing cam follower 313 is disposed in the lower position illustrated in FIG. 16. The timing is such that the cam follower 357 of the timing switch 351 is on a lobe 359 immediately prior to the position shown in FIG. 4. Since the shaft 53 and the followers 313 are rotating counterclockwise (FIG. 16) in the direction of the arrow E, it will be apparent that the timing switch 351 will be actuated when the associated gripping mechanism 297 (FIG. 4) is inclined downwardly and rearwardly of the shaft 53 immediately prior to moving into gripping engagement with a pear.

The inner surface of the cylindrical cam segment 324 and the reject cam segment 339 are contoured to control the gripping and releasing movement of the gripping mechanisms 297. The cam segment 324 (FIGS. 16 and 17) includes a short arcuate section 373 which is close to the shaft 53 and is effective when contacted by a cam follower 313 to hold the jaws of the controlled gripping mechanism at their maximum spacing which exceeds the width of any pear handled by the orienting and feeding apparatus. The cam follower 313 then enters a section 374 which gradually flares outwardly of the shaft 53 and which causes the jaws of the gripping mechanism to gradually close on a pear as the jaws enter the open rear end of the orienting mechanism 22 (FIG. 4) at the transfer station T. The gripped pear is then carried, if properly oriented, through substantially 250 degrees with the cam follower spaced, in accordance with the size of the pear, from large diameter arcuate sections 376 and 377 of the cam segment 326, which segments are separated by the opening 327. If, however, the pear is not properly oriented, the reject segment 339 enters the opening 327 and the cam follower 313 rides over a peaked section 378 of the segment 339 which effects opening of the gripping mechanism 297 and discharge of the unoriented fruit. It is understood that if the gripping mechanism 297 passes through any empty orienting mechanism, the associated cam follower 313 will ride over the peaked section 378 and open the jaws as if rejecting a misaligned pear.

In a preferred arrangement the timing cam, the cam followers, and the latch mechanism, and other associated parts are so arranged that, if two consecutive orienting units contain unoriented fruit, the reject circuit associated with the trailing unit will be energized before the latch is moved to unlatched position by the end 317 of the cam follower arm 312 associated with leading unit and will remain energized until after the arm end 317 drops the latch behind the abutment 369. In this way the repeated back and forth movement of the reject segment is avoided. More specifically the cam lobe 359 associated with the trailing unit must close switch 351 prior to the time the arm end 317 of the leading unit engages the latch inclined surface 371 and must hold it closed until the latch is dropped behind the abutment 369.

In order to prevent interference of the jaws of the gripping mechanism 297 (FIG. 3) with the fruit supporting cups 26 of the machine 27 when the jaws are either empty or full, a first raised sction 379 of the cam segment 326 engages the associated roller 313 to spread the jaws a sufficient distance to move past the fruit supporting cups 26 and to discharge each oriented pear from the mechanism 297 stem end down into the associated cup 26. A second raised section 381 of the cam segment 326 is effective to open the jaws to their widest position preparatory to approaching the next pear to be gripped.

The unoriented pears which are released at the reject station R (FIG. 1) in response to the associated roller 313 (FIG. 16) riding up the peaked portion 378 of the reject cam segment 339, fall into chutes 384 (FIG. 19) which are disposed between each of the orienting mechanisms 22. The chutes are secured, as by bolting, to the disc 60 of the turret 23 and each chute includes downwardly and outwardly inclined walls 385, 386 and 387 which are integral with each other. The leading edge 388 of the wall 385 is at the same level as the center of rear orienting roller 123 and conforms to the curvature of the rear orienting roller 123. The above parts are also integral with a horizontal trailing section 389 which is at the same level as and conforms to the shape of the leading edge of the U-shaped disc 182 of the following orienting mechanism 22. It is obvious that the unoriented pears will be discharged from the chute 384, will gravitate from the machine and be discharged from the pear orienting and feeding apparatus 22 through the opening 106a in the guard 106 which surrounds the turret 23.

In order to positively discharge all debris from the orienting mechanisms prior to their arrival at the feed station F below the feeder 21, a clearing device 391 (FIGS. 19 and 20) is provided. The clearing device 391 is supported from the frame 39 by a rod 392 which includes a horizontal section 393 that extends over the path of movement of the orienting mechanisms 22. A sleeve 394 is journalled on the section 393 and is prevented from axial movement by collars 396 and 397 (FIG. 20) that are locked to the section 393. The collar 397 has a stop bar 398 welded thereto which extends into position to be contacted by a spring connection bracket 399 to limit the counterclockwise (FIG. 19) pivotal movement of the sleeve 394. A spring 401 is connected between the bracket 399 and the collar 397 and urges the sleeve 394 in a counterclockwise direction.

The clearing device 391 includes a support strap 402 and a relatively thin somewhat resilient support plate 403 that are welded together and to the sleeve 394. A flexible rubber clearing flap 404 is bonded to the plate 403 and has its lower end shaped to contact and assume the contour of the orienting mechanisms 22. As each orienting mechanism 22 moves past the clearing device 391, the forward end wall 189 of the dish 182 engages the flap 404 and swings it clockwise (FIG. 19) against the urging of the spring 401. As the forward wall 189 advances past the flap 404, the spring 401 urges the flap downwardly against the pear supporting parts of the orienting mechanism 22 to sweep any debris therein out the open rear end of the dish 182 and down the adjacent chute 384.

In the operation of the pear orienting and feeding apparatus 20 of the present invention, the actions performed on one pear as it moves through the apparatus will be described.

After the fruit preparation machine 27 is placed (FIGS. 1 and 2) in operation, the feeder 21, the turret 23, and the transfer mechanism 24 are driven continuously while the fruit supporting cups 26 of the machine 27 are intermittently indexed into the discharge station D.

An ungraded pear is carried by one of the tubular pockets 82 (FIG. 2) of the feeder 21 until it reaches and falls through the discharge opening 79 into one of the orienting mechanisms 22 passing therebelow. The pear may initially assume any position in the orienting mechanism 22. If, for example, the stem end of the pear is disposed 180 degrees from the oriented position which is shown in FIG. 11, the frusto-conical portions 174 of the side rollers 166 and 167 will advance the pear rearwardly of the direction of travel of the orienting mechanism 22 and the bridge 146 will guide the stem end until the stem end contacts the belt 134 which aids in continuing the rearward movement of the pear and then swings the stem end of the pear upwardly and forwardly along an arcuate path to the oriented position as shown in FIG. 11.

If the stem end of a pear is initially directed rearwardly but the stem-blossom axis of the pear is not tangent to the path of movement of the orienting mechanism 22, the stem end will be advanced against one of the bulbous portions 124 or 126 of the rear roller 123 which will center the stem end of the pear laterally. The bridge 146 will guide the stem end into contact with belt 136 which will swing the pear through the above described arcuate path.

If a pear is disposed with its bulbous end in the cavity defined by the concave portions 176 of the rollers 166 and 167 and the concave belt 134, and the stem end of the pear is directed laterally of the orienting mechanism 22 against one side wall 183 of the dish 182, the stem end of the pear will be swung in an arc until it assumes the oriented position shown in FIG. 11. In this regard, it will be recognized that the belt's engagement with the blossom end of the pear tends to rotate the stem end towards the oriented position, and that the particular side roller opposite to the one on which the stem end is disposed tends to rotate the stem end to the oriented position. Orientation of this last mentioned pear will be encouraged when the orienting mechanism 22 is located at a point in its circular path of movement where the side roller, on which the stem end of the pear is supported, is not driven.

If a stubby pear that has a rounded body portion and a short stem end is deposited in the spherical chamber immediately in front of the belt 134, it will be rotated until its short nose falls into the space between the annular ridges 175.

It will be recognized that the manner of moving the belt 134 (FIG. 9) and the rollers 123, 166 and 167, will cause the blossom end of the pear at all times, to seek the cavity between the concave portions 176 of the rollers 166 and 167 and the concave surface of the belt 134. Similarly, the belt 134, the bulbous end portions 124 and 126 of the rear roller 123 and the frusto-conical portions 174 of the side rollers 166 and 167 will at all times tend to move the stem end of the pear so that the stem-blossom axis of the pear is tangent to the path of movement of the pear.

Before the orienting mechanism 22 reaches the transfer station T (FIG. 3), the bridge 146 is raised lifting the blossom end of the pear to a position more easily gripped by the jaws of the transfer mechanism 24. The bridge 146 is lifted by the cam track 158 (FIGS. 4 and 5).

Immediately prior to the time the orienting mechanism 22 and the pear therein reach the transfer station T (FIG. 3), the actuating stud 271 (FIG. 11) of the detecting device 200 rides along the arcuate detector switch cam 273. If the pear is properly oriented with its stem end bearing downwardly on the nose stop 192, the arcuate cam 273 will be moved downwardly thereby opening the normally closed switch 279 (FIGS. 14 and 18) preventing the actuation of the reject solenoid 346.

A pair of jaws of one of the fruit gripping mechanisms 297 (FIG. 4) then grips the raised pear and carries it upwardly past the reject station and discharges the pear stem end first into one of the fruit supporting cups 26 at the discharge station D (FIG. 3).

If the pear is not properly oriented as it approaches the transfer station T, the force acting downward on the arcuate cam 273 (FIG. 14) is not sufficient to depress the arm 274 and open the switch 279. Accordingly, the solenoid 346 (FIGS. 17 and 18) will be energized and the reject cam segment 339 will be moved into position to engage the cam follower 313 which effects opening of the fruit gripping mechanism 297 at the reject station R. The rejected pear then falls onto the particular chute 384 (FIG. 19) at the reject station R which follows the orienting mechanism 22, and is guided by the chute away from the orienting and feeding apparatus of the present invention. The free end 317 (FIG. 4) of the arm 312 which controls the actuation of the fruit gripping mechanism 297 then moves under the inclined surface 371 (FIG. 17) of the latch 363 thereby unlocking the reject cam segment 339 allowing it to be returned to its normal position shown in FIG. 17.

As the empty orienting mechanism 22 moves away from the reject station, the rubber clearing flap 404 (FIG. 19) is resiliently urged into the U-shaped dish 182 and forces all debris out of the open rear end thereof.

While the several fruit orienting units 22 are disclosed as being mounted on a turret and as depending on rotation of the turret to cause rotations of the several rollers and belts of the units, it is to be understood that this type of unit need no be associated with a turret but could be mounted in fixed position adjacent the cup in which the oriented fruit is to be deposited. In such a stationary installation a continuous drive member such as a gear driven from an electric motor could be arranged to drive the pinion gear 239. Also, a rotary cam having appropriate lobes could be associated with the rod 226 for engaging the sheaves 209 and 211 with the drive shaft 206.

In FIGURE 21 a second embodiment of the mechanism for rejecting unoriented pears is disclosed. In this arrangement, the reject mechanism prevents the fruit gripping arms from closing if the pear in the orienting unit is not properly oriented at the time the arms approach the position directly above the unit at which they pick up properly oriented pears. In FIGURE 21 the same reference numerals will be used for parts that correspond to parts of the previously described machine except that a suffix "a" will be attached to each reference numeral.

As seen in FIGURE 21, a drum cam 324a is provided with an internal cam track having a portion 377a, a portion 379a which is effective to open the jaws of the fruit gripping mechanism, a portion 381a which opens the jaws still further, and a downwardly inclined portion 374a which permits the jaws to close on a properly oriented fruit in an orienting unit. In the present embodiment of the reject mechanism a slidable reject segment 339a which is mounted for sliding movement under the control of a solenoid and a spring, such as the solenoid 346 and spring 349 of FIG. 17, is arranged to slide into position over the slanted cam surface 374a to provide a new cam surface 500 which is at substantially the same radial distance from the center of the drum 324a as the cam portion 373a which holds the jaws in wide open position. Accordingly, when the cam follower 313a rides along surface 500, the associated gripper arms will be held open.

It will be understood of course that the electrical control part of the reject mechanism will be so adjusted that a timing cam, corresponding to timing cam 338 (FIG. 16) will be arranged to complete the circuit to a reject solenoid 346a (not shown) before the cam follower 313a reaches point X (FIG. 21). Accordingly, if a properly oriented fruit is in the orienting unit, the solenoid will not be energized and the cam follower 313a will ride down slanted cam surface 374a to permit the gripping jaws to close and grip the oriented fruit. If, however, the fruit has not been oriented prior to reaching point X, the solenoid will be actuated and the reject segment 339a will be slid into place over cam surface 374a to prevent the jaws from closing on the unoriented pear.

After the cam follower has passed the fruit gripping zone, it will ride down a cam surface 501 of reject segment 339a permitting the jaws to close until one of the gripper arms 299 (FIG. 4) engages the hub 308 of the gear 307. Thus, the hub 308 acts as a stop to limit the closing movement of the jaws. The unoriented fruit remaining in the unit will, of course, be ejected from the unit by the clearing device 391 or a similar device.

From the foregoing description it is apparent that the pear orienting and feeding apparatus of the present invention is arranged to orient pears or similarly shaped articles with their longitudinal axes disposed tangent to the path of movement of the pears and with their stem ends leading the blossom ends of the pear. The apparatus also includes a device for detecting whether the pears are properly or improperly oriented. A mechanism is provided to reject all improperly oriented pears and another mechanism is provided to transfer all oriented pears to the fruit supporting cup of a fruit preparation machine.

While one embodiment of the present invention has been shown and described, it will be understood that various changes and modifications may be made without departing from the spirit of the invention or the scope of the appended claims.

The invention having thus been described what is believed to be new and desired to be protected by Letters Patent is:

1. In a fruit preparation machine having a fruit supporting cup movable into fruit receiving position, a fruit feeding and orienting apparatus comprising a carrier, orienting means on said carrier for orienting fruit so that its stem blossom axis will be disposed in a predetermined position relative to said orienting means, means for moving said carrier for advancing said orienting means to a position adjacent the fruit supporting cup, means for detecting fruit which is properly oriented while said orienting means is being advanced, transfer means including jaws for gripping the fruit and for opening said jaws and for transferring the properly oriented fruit into the cup, and fruit rejecting means included in said transfer means and responsive to the detection of improperly oriented fruit by said detecting means for opening said jaws and for rejecting improperly oriented fruit from said transfer means before said jaws supporting the unoriented fruit arrive at said cup.

2. In a fruit preparation machine having a fruit supporting cup movable into fruit receiving position, a fruit feeding and orienting apparatus comprising, a carrier, orienting means on said carrier, a plurality of rollers in said orienting means arranged to support the fruit and mounted for rotation about axes which are angled relative to each other, drive means independently connected to said rollers for rotating said rollers independently of each other in directions which will cause the fruit to become oriented with its stem blossom axis disposed in a predetermined position relative to said orienting means, means connected to said carrier for moving said carrier so as to advance said orienting means along a predetermined path, means connected to said orienting means for detecting properly oriented fruit while said orienting means is being advanced, and transfer means positioned adjacent the cup along said path and arranged to transfer the properly oriented fruit into the cup.

3. In a pear preparation machine, a pear orienting apparatus comprising support means, three rollers journalled on said support means with their longitudinal axes substantially defining a triangle with one apex disposd in a lower plane than the axis of the opposed roller, a nose stop carried by said support means and positioned between said rollers adjacent said apex, and drive means connected to said roller for rotating said opposed roller in a direction which tends to raise the pear and for rotating the other rollers in a direction which tends to lower the pear and to center the stem end of the pear therebetween.

4. In a pear preparation machine, a pear orienting apparatus comprising support means, three rollers journalled on said support means with their longitudinal axes substantially defining a triangle with one apex disposed in a lower plane than the axis of the opposed roller, a nose stop carried by said support means and positioned between said rollers adjacent said apex, an idler roller journalled on said support means below said rollers, a belt trained around said opposed roller and said idler roller, and drive means connected to said rollers for rotating said opposed roller and belt in a direction which tends to raise the pear and for rotating the other rollers in a direction which tends to lower the pear and to center the stem end of the pear therebetween, said drive means including a transmission independently connected to said other rollers for selectively driving said other rollers simultaneously or for driving one roller while the other is immobilized.

5. In a pear preparation machine, a pear orienting apparatus comprising support means, a pair of rollers journalled on said support means and cooperating for defining a generally hemispherical cavity for receiving the bulb end of a pear and a generally V-shaped cavity leading into said hemispherical cavity for receiving the stem end of the pear, pear rotating means journalled on said support means and having pear contacting surfaces adjacent said hemispherical cavity and adapted to engage the projecting stem end of a pear whose bulb end is in said cavity, said contacting surfaces being arranged to cooperate with said rollers for swinging the stem end of the pear toward said V-shaped cavity and into a position centered laterally of said rollers, and drive means connected to said rollers and to said pear rotating means for driving said rollers and pear rotating means in directions which will cause the bulb end of a pear to enter said generally hemispherical cavity and the stem end of the pear to enter said V-shaped cavity.

6. In a pear preparation machine, a pear orienting apparatus comprising support means, a first roller having generally truncated spherical end portions and a central portion, an idler roller journalled on said support means and disposed below and to one side of said first roller, an endless belt trained around said idler roller and said central portion of said first roller and having a concave fruit contacting surface, a pair of side rollers journalled for rotation on said frame with said belt disposed therebetween, a nose stop disposed between said side rollers in position to receive the nose of a pear, and drive means connected to said rollers for rotating said first roller and said belt so that the fruit contacting surfaces thereof move upwardly and away from said nose stop and for moving said side rollers in a direction wherein their fruit contacting surfaces move downwardly and toward each other so as to effect pivotal movement of said pear until the stem end thereof is positioned on said nose stop and the bulb end is disposed against said belt, said drive means including a transmission independently connected to said side rollers for selectively driving both side rollers simultaneously or for driving one side roller while the other side roller is immobilized.

7. In a fruit preparation machine having a fruit supporting cup movable into fruit receiving position and orienting means disposed adjacent the cup, the improvement which comprises a movable transfer mechanism including a pair of cooperating jaws, means for moving said jaws between the cup and the orienting means, resilient means connected to said jaws for urging said jaws into gripping engagement with a fruit in the orienting means, cam means operatively connected to said jaws for controlling the movement of said jaws, said cam means including a first fixed portion for allowing resilient closing of said jaws on an oriented fruit in the orienting means and a second fixed portion for opening said jaws to permit discharge of oriented fruit into the cup, a movable cam segment in said cam means disposed between said first and second fixed portions and movable between an operative position for opening said jaws prior to their arrival at the cup and an inoperative position, detecting means associated with the orienting means for detecting the presence of an oriented fruit in the orienting means, and means connected between said movable cam segment and said detecting means and responsive to the absence of a properly oriented fruit for effecting movement of said movable cam segment into operative position.

8. In a fruit preparation machine, a turret, means for driving said turret, a plurality of equally spaced orienting mechanisms carried by said turret and movable in a circular path, each of said orienting mechanisms including a U-shaped dish having an open rear end, a plurality of inclined chutes with a chute being secured to said turret between each of said orienting mechanisms, and a flexible resilient flap disposed in the path of movement of said dishes and arranged to enter said dishes and sweep debris therefrom and into the adjacent inclined chutes for discharge from the machine upon movement of said orienting mechanisms past said flap.

9. In a pear preparation machine having a pear supporting cup movable into pear receiving position the combination of a continuously rotating horizontal turret, an orienting mechanism carried by said turret, a rotary transfer mechanism having a pair of jaws for gripping and transferring an oriented pear from said orienting mechanism to said cup, drive means connected to said turret and said transfer mechanism for driving the same in timed relation, a nose stop pivotally mounted on said orienting mechanism for movement between an upper and a lowered position and arranged to be held in said lowered position by the stem end of an oriented pear, and means responsive to the presence of said nose stop in the upper position to effect opening of said jaws at a point intermediate said orienting mechanism and the cup for releasing and discharging unoriented pears from the machine prior to their arrival at the cup.

10. In a pear preparation machine having a pear supporting cup movable into pear receiving position the combination of a continuously rotating horizontal turret, an orienting mechanism carried by said turret, a rotary transfer mechanism having a pair of jaws for gripping and transferring an oriented pear from said orienting mechanism to said cup, drive means connected to said turret and to said transfer mechanism for driving the same in timed relation, a bridge mounted for vertical movement in said orienting mechanism and arranged to support the bulbous end of an oriented pear, means for raising said bridge when the jaws of said transfer mechanism are in position to grip the fruit, a nose stop pivotally mounted on said orienting mechanism and arranged to be held in a lowered position by the stem end of an oriented pear, and means responsive to the presence of said nose stop in the elevated position to effect opening of said jaws at a point intermediate said orienting mechanism and the cup for releasing and discharging unoriented pears from the machine prior to their arrival at the cup.

11. In a fruit preparation machine, a support member, a plurality of rotatable rollers mounted on said member and defining a fruit orienting cavity, a fruit detecting member projecting into said cavity and mounted for movement between a lowered position and a raised position, said detecting member being normally disposed in said lowered position and being held against upward movement only when a properly oriented fruit rests thereon, a fruit reject mechanism for effecting the removal of a fruit from said cavity, means for periodically activating said reject mechanism, and means responsive to the positioning of said detecting member in said lower position with an oriented fruit thereon for deactivating the actuating mechanism of said reject mechanism.

12. In a pear preparation machine, a pear orienting apparatus comprising support means, a pair of rollers journalled on said support means and cooperating to define a generally bulb shaped cavity for receiving the bulb end of a pear and an elongated cavity leading into said bulb shaped cavity for receiving the stem end of the pear, each roller having a reduced diameter portion adjacent said bulb-shaped cavity and a tapering portion that progressively decreases in cross-sectional area as it approaches said reduced diameter portion, said tapering portion defining a pear advancing ridge on a small diameter portion thereof between said bulb shaped cavity and said elongated cavity, each ridge being at an angle relative to the longitudinal centerline of said elongated cavity, and drive means connected to said rollers for driving said rollers in directions which will cause said ridges to move the bulb end of the pear toward and into said bulb shaped cavity and which will cause the stem end of the pear to enter the elongated cavity.

13. In a pear preparation machine, a pear orienting apparatus comprising support means, a pair of rollers journalled on said support means and cooperating to define a generally bulb shaped cavity for receiving the bulb end of a pear and an elongated cavity leading into said bulb shaped cavity for receiving the stem end of the pear, each of said rollers having a portion leading into said bulb shaped cavity of smaller diameter and a portion spaced from said bulb shaped cavity of larger diameter to define frusto-conical pear contacting and driving surfaces, pear rotating means journalled on said support means and having pear contacting surfaces adjacent said bulb shaped cavity and adapted to engage the projecting stem end of a pear whose bulb end is in said cavity, said contacting surfaces being arranged to cooperate with said rollers for swinging the stem end of a pair into a position centered laterally of said rollers, and drive means connected to said rollers and to said pear rotating means for rotating said rollers and said pear rotating means in directions which will cause said driving surfaces to move the bulb end of the pear into said bulb shaped cavity and which will cause the stem end of the pear to enter the elongated cavity.

14. In a pear preparation machine, a pear orienting apparatus comprising support means, a pair of rollers journalled in said support means, said rollers having pear contacting surfaces cooperating to define a pear shaped cavity having a bulb receiving portion and a stem receiving portion, pear rotating means journalled on said support means and having pear contacting surfaces adjacent said pear shaped cavity and adapted to engage the projecting stem end of a pear whose bulb end is in said cavity, said contacting surfaces being arranged to cooperate with said rollers for swinging the stem end of a pear into a position centered laterally of said rollers, and drive means connected to said rollers and to said pear rotating means for driving said rollers and pear rotating means in directions which will cause the bulb end of a pear to enter said bulb receiving portion and the stem end of the pear to enter said stem receiving portion.

15. In a pear preparation machine, a pear orienting apparatus comprising support means, a plurality of rollers journalled on said support means, said rollers having pear contacting surfaces cooperating to define a pear shaped cavity having a bulb receiving portion and a stem receiving portion, drive means connected to said rollers for driving said rollers in directions which will cause the bulb end of a pear to enter said bulb receiving portion and the stem end of the pear to enter said stem receiving portion, and detecting means for distinguishing an unoriented pear from a pear which is properly oriented with its bulbous end received in the bulb receiving portion and with its stem end received in its stem receiving portion.

16. In a fruit preparation machine having a fruit supporting cup movable into fruit receiving position, a fruit feeding and orienting apparatus comprising, a carrier, orienting means on said carrier, a plurality of rollers in said orienting means having surfaces defining a cavity arranged to support the fruit, said rollers having fruit contacting surfaces which are angled relative to each other, drive means connected to said rollers for rotating said rollers in directions which will cause the fruit to become oriented with its stem-blossom axis disposed in a predetermined position relative to said orienting means, means connected to said orienting means for detecting properly oriented fruit while said rollers are being rotated, and transfer means positioned adjacent the cup and arranged to transfer the properly oriented fruit from the orienting means into the cup.

References Cited in the file of this patent
UNITED STATES PATENTS

| | | |
|---|---|---|
| 2,581,732 | Thompson | Jan. 8, 1952 |
| 2,788,818 | Skog | Apr. 16, 1957 |
| 2,933,174 | Hait | Apr. 19, 1960 |
| 2,961,087 | Reading | Nov. 22, 1960 |